(12) United States Patent
Burberry et al.

(10) Patent No.: US 9,058,084 B2
(45) Date of Patent: Jun. 16, 2015

(54) HYBRID SINGLE-SIDE TOUCH SCREEN

(71) Applicants: Mitchell Stewart Burberry, Webster, NY (US); Ronald Steven Cok, Rochester, NY (US)

(72) Inventors: Mitchell Stewart Burberry, Webster, NY (US); Ronald Steven Cok, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 180 days.

(21) Appl. No.: 13/862,586

(22) Filed: Apr. 15, 2013

(65) Prior Publication Data

US 2014/0307177 A1      Oct. 16, 2014

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01); *G06F 2203/04111* (2013.01); *G06F 2203/04112* (2013.01)

(58) Field of Classification Search
CPC ............ G06F 2203/04103; G06F 2203/04111; G06F 2204/04112; H01B 5/14
See application file for complete search history.

(56) References Cited

U.S. PATENT DOCUMENTS

| | | | |
|---|---|---|---|
| 8,179,381 B2 | 5/2012 | Frey et al. | |
| 8,273,654 B1 | 9/2012 | Nelson et al. | |
| 8,274,486 B2 | 9/2012 | Barbier et al. | |
| 8,614,403 B2 * | 12/2013 | Tanaka et al. | 200/600 |
| 8,704,779 B2 * | 4/2014 | Hristov et al. | 345/173 |
| 2004/0213962 A1 * | 10/2004 | Bourdelais et al. | 428/172 |
| 2008/0264699 A1 * | 10/2008 | Chang et al. | 178/18.01 |
| 2008/0277259 A1 * | 11/2008 | Chang | 200/600 |
| 2010/0026664 A1 | 2/2010 | Geaghan | |
| 2010/0328248 A1 | 12/2010 | Mozdzyn | |
| 2011/0007011 A1 | 1/2011 | Mozdzyn | |
| 2011/0099805 A1 | 5/2011 | Lee | |
| 2013/0038553 A1 * | 2/2013 | Huang et al. | 345/173 |
| 2014/0198264 A1 * | 7/2014 | Gao et al. | 349/12 |
| 2014/0209444 A1 * | 7/2014 | Lai et al. | 200/600 |
| 2014/0335312 A1 * | 11/2014 | Suh et al. | 428/143 |

FOREIGN PATENT DOCUMENTS

CN          102063951          5/2011

* cited by examiner

*Primary Examiner* — Alexander Eisen
*Assistant Examiner* — Sanjiv D Patel
(74) *Attorney, Agent, or Firm* — Raymond L. Owens (57) ABSTRACT

A single-side touch-screen device includes a substrate having a cured layer with a patterned arrangement of micro-channels embossed therein and a cured electrically conductive micro-wire formed in each micro-channel. A patterned dielectric insulator is located over one or more middle portions of at least some of the micro-wires forming insulated micro-wire portions and exposed micro-wire portions. A plurality of patterned transparent conductors are conformally coated in an array over at least a part of the patterned dielectric insulator, at least a part of the insulated micro-wire portions, and at least a part of the exposed micro-wire portions, the at least a part of the exposed micro-wire portions electrically connected to at least a portion of the patterned transparent conductors. The transparent conductors and the micro-wires form an array of electrically connected horizontal electrodes and an array of electrically connected vertical electrodes electrically isolated from the horizontal electrodes.

6 Claims, 11 Drawing Sheets

HYBRID SINGLE-SIDE TOUCH SCREEN

CROSS REFERENCE TO RELATED APPLICATIONS

Reference is made to commonly-assigned, co-pending U.S. patent application Ser. No. 13/862,679 filed Apr. 15, 2013, entitled "Hybrid Single-Side Touch Screen Method" by Mitchell Burberry et al, the disclosure of which is incorporated herein.

FIELD OF THE INVENTION

The present invention relates to transparent electrodes having micro-wires formed in micro-channels and in particular to the micro-channel structure.

BACKGROUND OF THE INVENTION

Transparent conductors are widely used in the flat-panel display industry to form electrodes that are used to electrically switch light-emitting or light-transmitting properties of a display pixel, for example in liquid crystal or organic light-emitting diode displays. Transparent conductive electrodes are also used in touch screens in conjunction with displays. In such applications, the transparency and conductivity of the transparent electrodes are important attributes. In general, it is desired that transparent conductors have a high transparency (for example, greater than 90% in the visible spectrum) and a low electrical resistivity (for example, less than 10 ohms/square).

Transparent conductive metal oxides are well known in the display and touch-screen industries and have a number of disadvantages, including limited transparency and conductivity and a tendency to crack under mechanical or environmental stress. Typical prior-art conductive electrode materials include conductive metal oxides such as indium tin oxide (ITO) or very thin layers of metal, for example silver or aluminum or metal alloys including silver or aluminum. These materials are coated, for example, by sputtering or vapor deposition, and are patterned on display or touch-screen substrates, such as glass. For example, the use of transparent conductive oxides to form arrays of touch sensors on one side of a substrate is taught in U.S. Patent Application Publication 2011/0099805 entitled "Method of Fabricating Capacitive Touch-Screen Panel".

Transparent conductive metal oxides are increasingly expensive and relatively costly to deposit and pattern. Moreover, the substrate materials are limited by the electrode material deposition process (e.g. sputtering) and the current-carrying capacity of such electrodes is limited, thereby limiting the amount of power that is supplied to the pixel elements. Although thicker layers of metal oxides or metals increase conductivity, they also reduce the transparency of the electrodes.

Transparent electrodes including very fine patterns of conductive elements, such as metal wires or conductive traces are known. For example, U.S. Patent Publication No. 2011/0007011 teaches a capacitive touch screen with a mesh electrode, as do U.S. Patent Publication No. 2010/0026664, U.S. Patent Publication No. 2010/0328248, and U.S. Pat. No. 8,179,381, which are hereby incorporated in their entirety by reference. As disclosed in U.S. Pat. No. 8,179,381, fine conductor patterns are made by one of several processes, including laser-cured masking, inkjet printing, gravure printing, micro-replication, and micro-contact printing. In particular, micro-replication is used to form micro-conductors formed in micro-replicated channels. The transparent micro-wire electrodes include micro-wires between 0.5μ and 4μ wide and a transparency of between approximately 86% and 96%.

Conductive micro-wires are formed in micro-channels embossed in a substrate, for example as taught in CN102063951, which is hereby incorporated by reference in its entirety. As discussed in CN102063951, a pattern of micro-channels are formed in a substrate using an embossing technique. Embossing methods are generally known in the prior art and typically include coating a curable liquid, such as a polymer, onto a rigid substrate. A pattern of micro-channels is embossed (impressed) onto the polymer layer by a master having an inverted pattern of structures formed on its surface. The polymer is then cured. A conductive ink is coated over the substrate and into the micro-channels, the excess conductive ink between micro-channels is removed, for example by mechanical buffing, patterned chemical electrolysis, or patterned chemical corrosion. The conductive ink in the micro-channels is cured, for example by heating. In an alternative method described in CN102063951, a photosensitive layer, chemical plating, or sputtering is used to pattern conductors, for example using patterned radiation exposure or physical masks. Unwanted material (e.g. photosensitive resist) is removed, followed by electro-deposition of metallic ions in a bath.

Capacitive touch screen devices are constructed by locating electrodes on either side of a dielectric layer. In another design, electrodes are located on the same side of a substrate layer. U.S. Pat. No. 8,274,486 discloses a touch screen assembly and method of manufacturing thereof that includes a single layer of conductive material. The conductive material is configured to include a horizontal pattern and a vertical pattern of electrodes, with one of the patterns having gaps between the electrodes, such that the electrodes in the horizontal pattern do not come into direct contact with electrodes in the vertical pattern. To provide a connection between the electrodes separated by gaps in the interrupted pattern, an insulating material is placed onto the gaps over the uninterrupted pattern, and a printable and electrically conductive connector is positioned over the insulating material and functions to couple at least two electrodes together. In one embodiment, the conductive connector includes carbon nanotubes.

There is a need, however, for further improvements in conductivity, transparency, connectivity, and manufacturability for micro-wire transparent electrodes and touch screens.

SUMMARY OF THE INVENTION

In accordance with the present invention, a single-side touch-screen device comprises:
 a substrate;
 a cured layer formed on the substrate, the cured layer having a patterned arrangement of micro-channels embossed therein and a cured electrically conductive micro-wire formed in each micro-channel;
 a patterned dielectric insulator located over one or more middle portions of at least some of the micro-wires forming insulated micro-wire portions and exposed micro-wire portions;
 a plurality of patterned transparent conductors conformally coated in an array over at least a part of the patterned dielectric insulator, at least a part of the insulated micro-wire portions, and at least a part of the exposed micro-wire portions, the at least a part of the exposed micro-wire portions electrically connected to at least a portion of the patterned transparent conductors; and wherein the transparent conductors and the micro-wires form an array of electrically connected horizontal electrodes and an array of electrically connected vertical electrodes electrically isolated from the horizontal electrodes.

The present invention provides an array of transparent touch sensors arranged in arrays of electrically isolated horizontal and vertical electrodes on one side of a substrate that have improved conductivity and transparency and are more readily manufactured. The transparent electrodes of the present invention are particularly useful in capacitive touch screens and display devices.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

The Figures are not drawn to scale since the variation in size of various elements in the Figures is too great to permit depiction to scale.

DETAILED DESCRIPTION OF THE INVENTION

Figure 1:
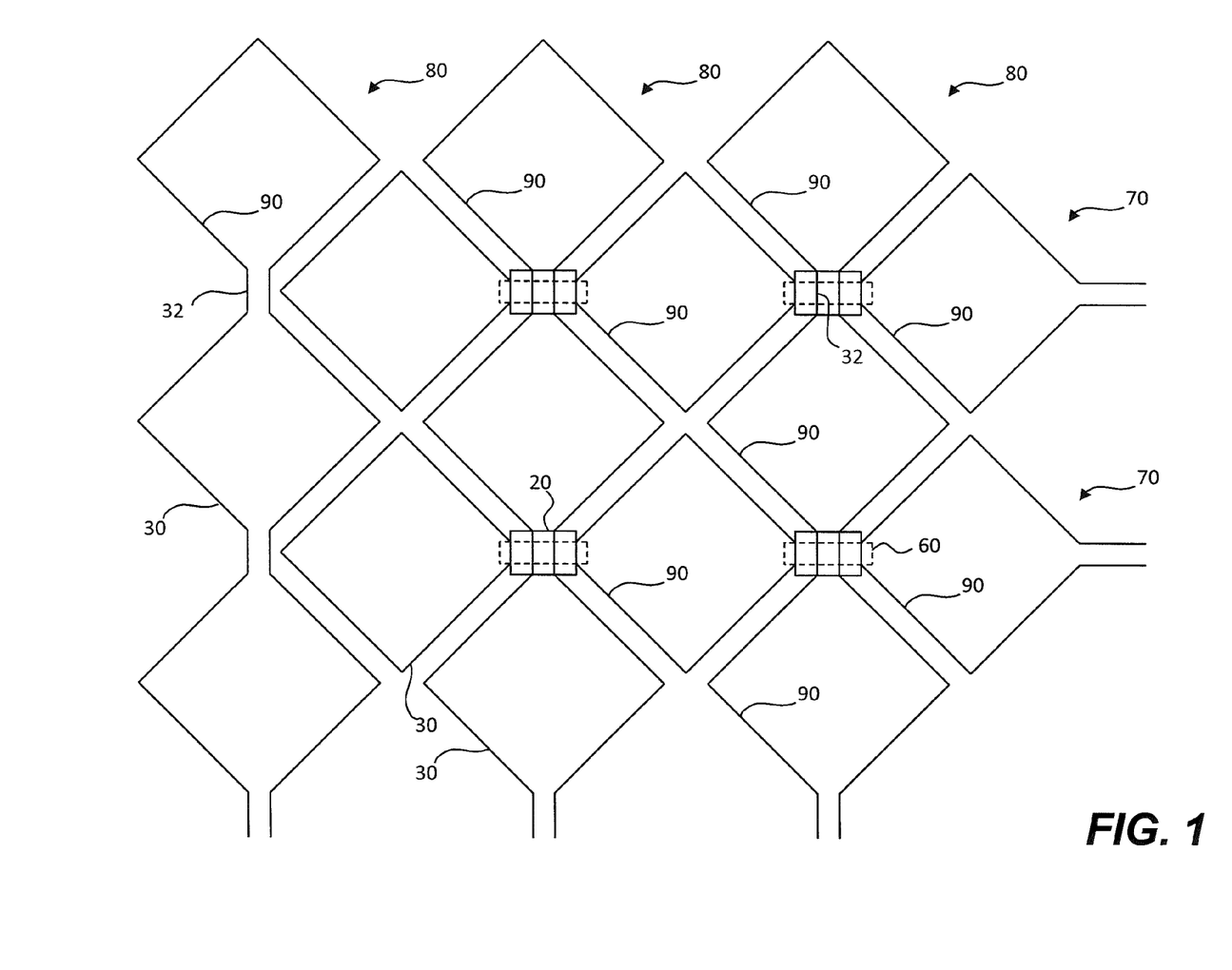
FIG. 1 is a plan view of an embodiment of the present invention.
Figure 2:
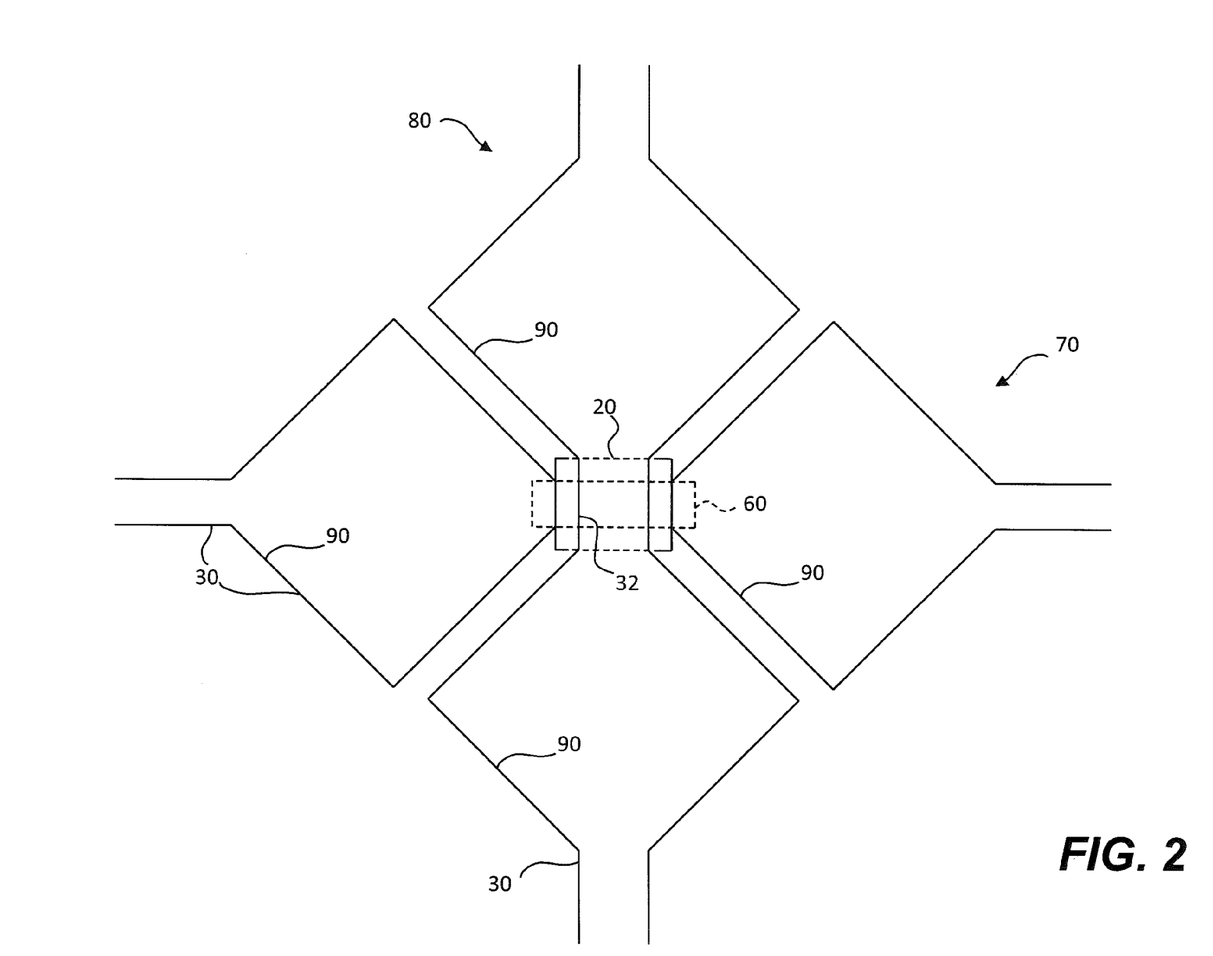
FIG. 2 is a plan view of a detail from FIG. 1 illustrating an embodiment of the present invention.
Figure 3:
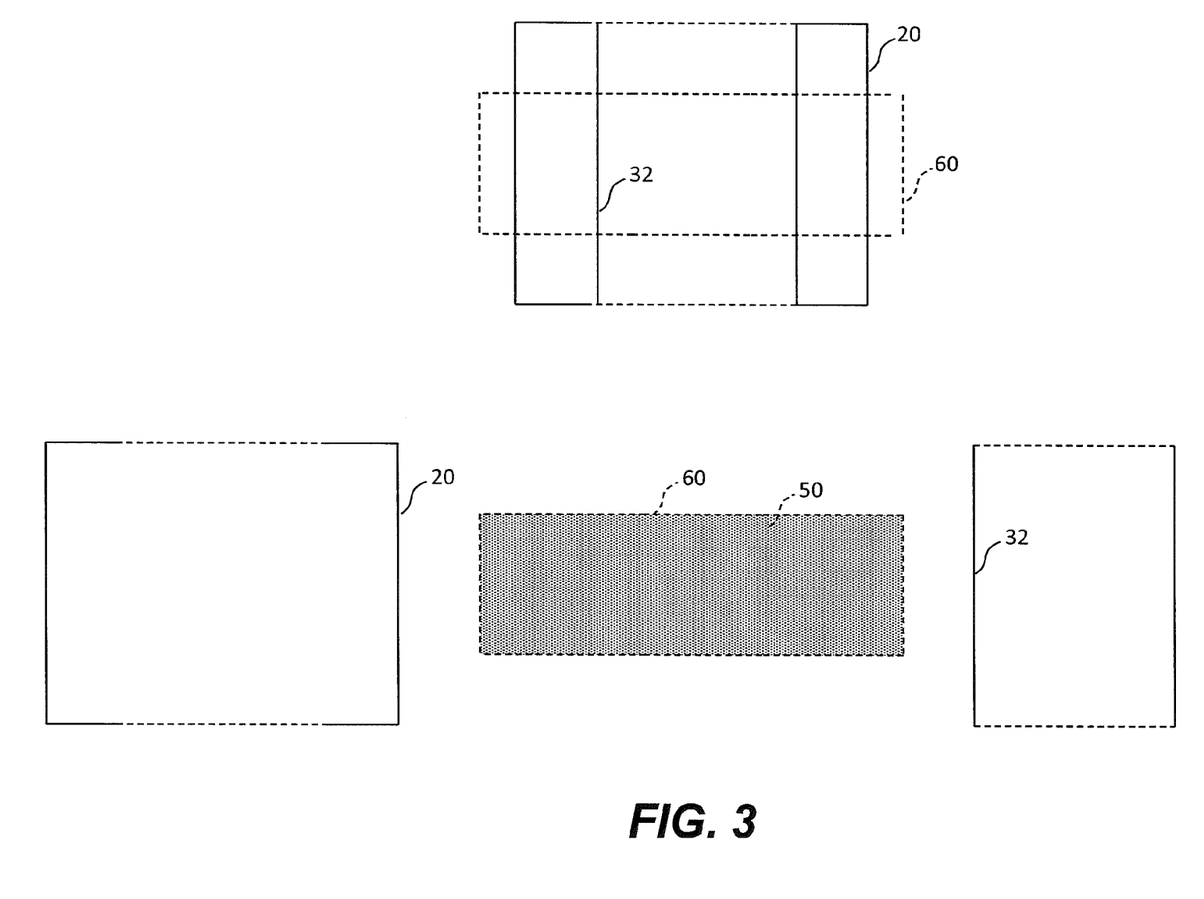
FIG. 3 is a plan view of layer components illustrated in FIGS. 1 and 2 according to an embodiment of the present invention.
Figure 4A:
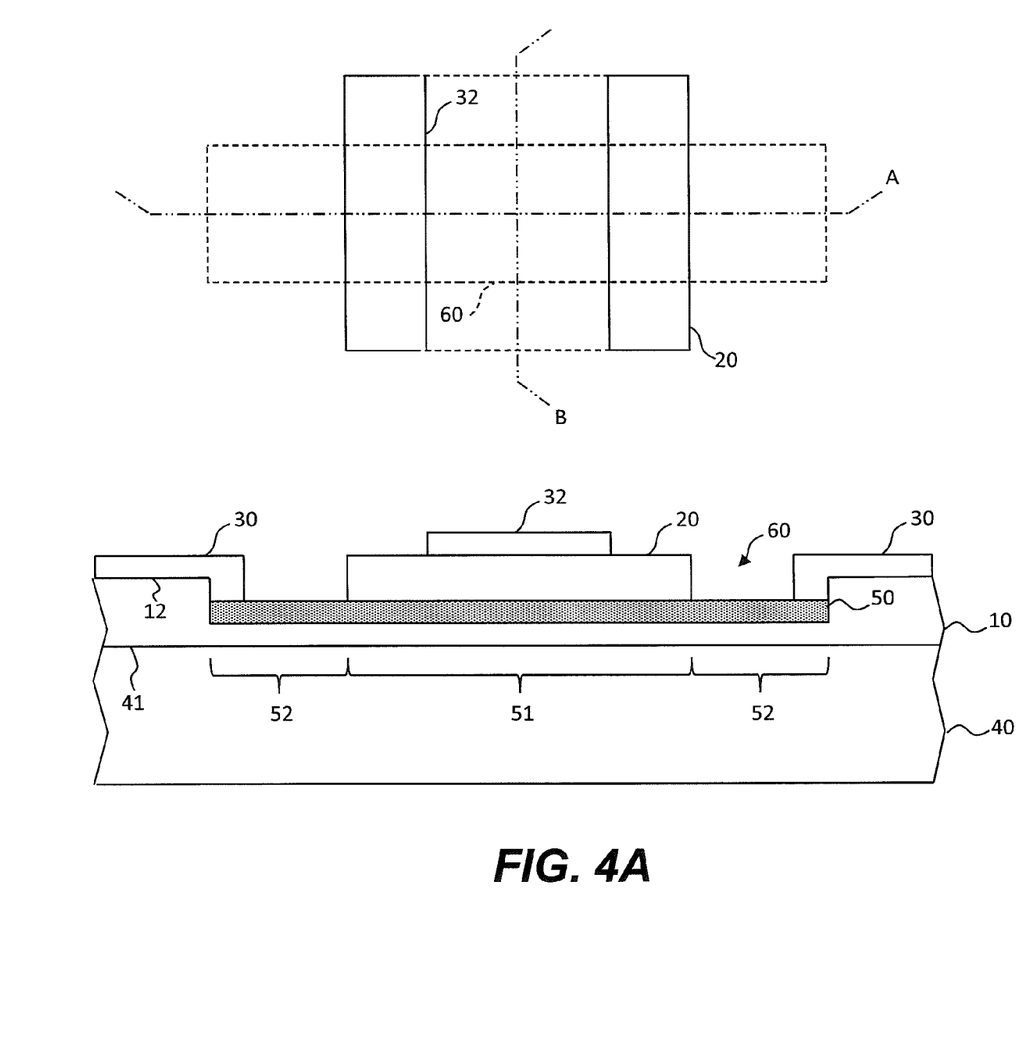
FIG. 4A is a plan view and corresponding cross section A of an embodiment of the present invention.
Figure 4B:
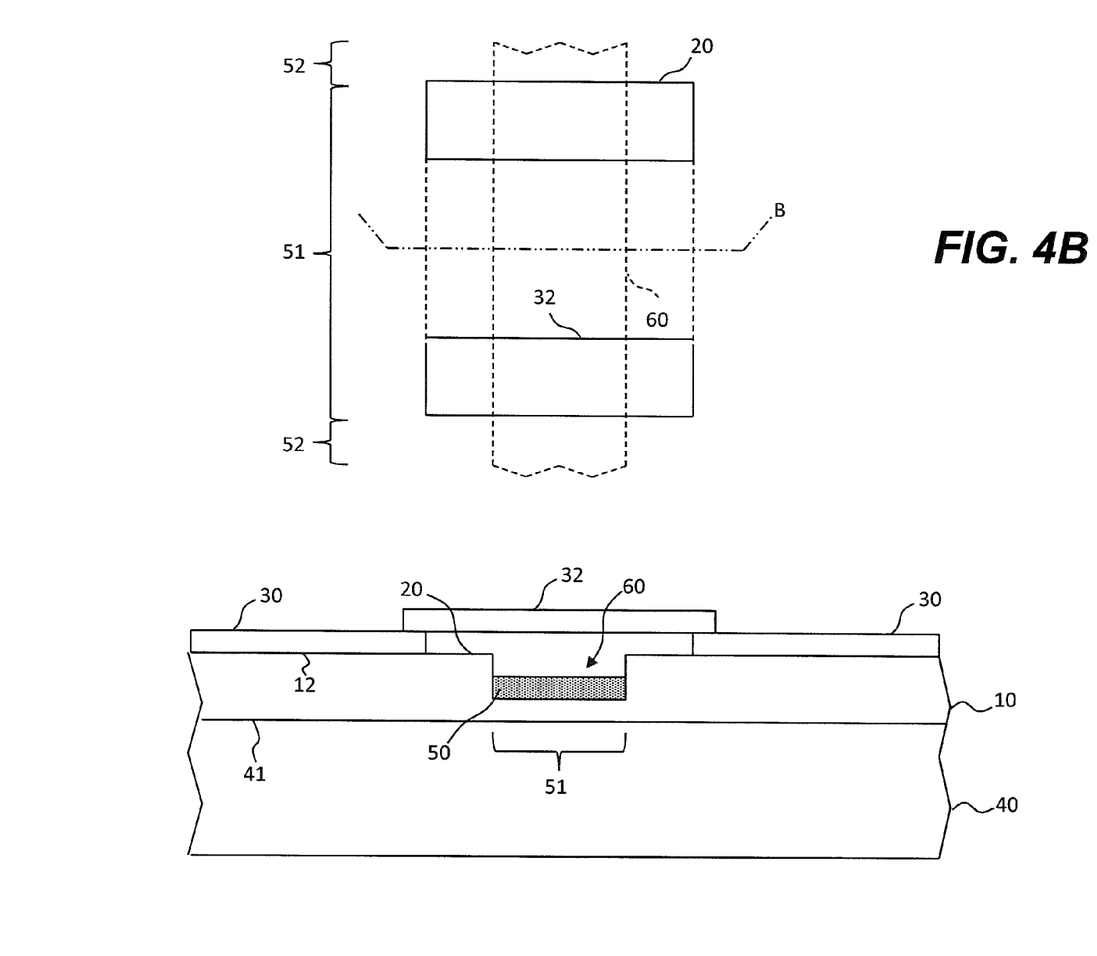
FIG. 4B is a plan view and corresponding cross section B of an embodiment of the present invention orthogonal to the cross section of FIG. 4A.

Referring to FIG. 1, the detail of FIG. 2, the exploded illustration of FIG. 3, and the plan and cross sections of FIGS. 4A and 4B, in an embodiment of the present invention a substrate 40 has a cured layer 10 formed on a substrate surface 41 of substrate 40. A patterned arrangement of micro-channels 60 are embossed in cured layer 10. Each micro-channel 60 has a cured electrical conductor forming a micro-wire 50 in the micro-channel 60. A patterned dielectric insulator 20 is located over one or more middle portions of at least some of micro-wires 50 forming insulated micro-wire portions 51 and exposed micro-wire portions 52. As used herein, a middle portion of a micro-wire is a portion of the micro-wire between and not including end portions of the micro-wire.

A plurality of patterned transparent conductors 30 and transparent conductor electrical connections 32 are conformally coated in an array over at least a part of the patterned dielectric insulator 20, at least a part of the insulated micro-wire portions 51, at least a part of the exposed micro-wire portions 52, and over portions of a cured-layer surface of cured layer 10. The at least a part of the exposed micro-wire portions 52 are electrically connected to at least a portion of the patterned transparent conductors 30. Transparent conductors 30 and micro-wires 50 form an array of electrically connected horizontal electrodes 70 and an array of electrically connected vertical electrodes 80 electrically isolated from the horizontal electrodes 70. The designation of horizontal and vertical are arbitrary and can be exchanged. As is commonly known in the display and touch-screen arts, horizontal and vertical refer to orthogonal directions over a substrate.

Horizontal electrodes 70 and vertical electrodes 80 can each be connected to an electrical connection electrically controlled by an external electrical circuit, for example an integrated circuit. Horizontal and vertical electrodes, 70, 80 can be controlled to enable a touch screen formed on the single, common substrate surface 41 of substrate 40.

Referring specifically to FIGS. 1 and 2, diamond-shaped electrically conductive touch sensors 90 are located in an orthogonal array and are electrically connected to form horizontal and vertical electrodes 70, 80. Each horizontal and vertical electrode 70, 80 is electrically isolated from every other horizontal and vertical electrode 70, 80. Each touch sensor 90 is electrically continuous in a common plane (on cured-layer surface 12 in FIGS. 4A and 4B). Touch sensors 90 in vertical electrodes 80 are electrically connected by transparent conductor electrical connections 32 as is seen in the leftmost vertical electrode in FIG. 1. Touch sensors 90 in horizontal electrodes 70 are separated by transparent conductor electrical connections 32 in vertical electrodes 80 and are electrically connected by micro-channels 60 with micro-wires 50 (not shown). Patterned dielectric insulators 20 are located over the micro-channels 60 and under the transparent conductor electrical connections 32 between touch sensors 90 in horizontal and vertical electrodes 70, 80. Conformally coated transparent conductors form patterned transparent conductor electrical connections 32 between touch sensors 90 in vertical electrodes 80 over patterned dielectric insulators 20 and, in an embodiment, are formed in a common step with touch sensors 90. Patterned dielectric insulators 20 electrically insulate transparent conductor electrical connections 32 between touch sensors 90 in vertical electrodes 80 from electrical connections between touch sensors 90 in horizontal electrodes 70.

Specifically referring in more detail to FIG. 2, a two-by two array of touch sensors 90 form portions of horizontal electrode 70 and vertical electrode 80. Micro-channel 60 with micro-wire 50 (not shown) extends between and electrically connects adjacent touch sensors 90 in horizontal electrode 70. Dielectric insulator 20 is patterned over each juncture of horizontal and vertical electrodes 70, 80 and over micro-channel 60 with micro-wire 50 (not shown). Transparent conductor electrical connections 32 are patterned over dielectric insulators 20 to electrically connect touch sensors 90 in vertical electrodes 80 but are not electrically connected to micro-wires 50 (not shown) in micro-channel 60. Thus transparent conductor electrical connection 32 extends over the edge of dielectric insulator 20 in the vertical direction to electrically connect touch sensors 90 in vertical electrodes 80 but does not extend over the edge of dielectric insulator 20 in the horizontal direction and is therefore electrically isolated from touch sensors 90 in horizontal electrodes 70 and micro-wires 50 (not shown) in micro-channels 60.

In an embodiment and as shown in FIGS. 1 and 2, touch sensors 90 are formed from patterned transparent conductor 30. Thus, touch sensors 90 and transparent conductor electrical connection 32 are formed in a common step and are part of a layer formed conformally over substrate 40 (not shown). The present invention provides an advantage over the prior art in that conformally coated transparent conductor touch sensors 90 and transparent conductor electrical connections 32 are formed in a common step and the conformal coating enables electrically continuous coating over the edge of patterned dielectric insulator 20.

Other methods for forming an electrical connector between adjacent touch sensors 90 over a dielectric insulator 20 can be prone to electrical discontinuities due to micro-wire breaks at the edge of the transparent conductor 30, as is seen more clearly in cross section and discussed further below. Referring further to FIG. 3, each of the three layers in the juncture between horizontal and vertical electrodes 70, 80 (not shown) is separately illustrated. Micro-channel 60, located closest to substrate surface 41 (not shown) extends beyond the horizontal edges of dielectric insulator 20 to electrically connect micro-wires 50 formed in micro-channels 60 to touch sensors 90 (not shown) of horizontal electrodes 70 (not shown). Micro-wire 50 is shown in the separate illustration of micro-channel 60. Transparent conductor electrical connection 32 extends beyond the vertical edges of dielectric insulator 20 to electrically connect touch sensors 90 of vertical electrodes 80 but not beyond the horizontal edges of dielectric insulator 20 to electrically isolate touch sensors 90 of vertical electrodes 80 from micro-wires 50 and touch sensors 90 of horizontal electrodes 70.

Figure 6:
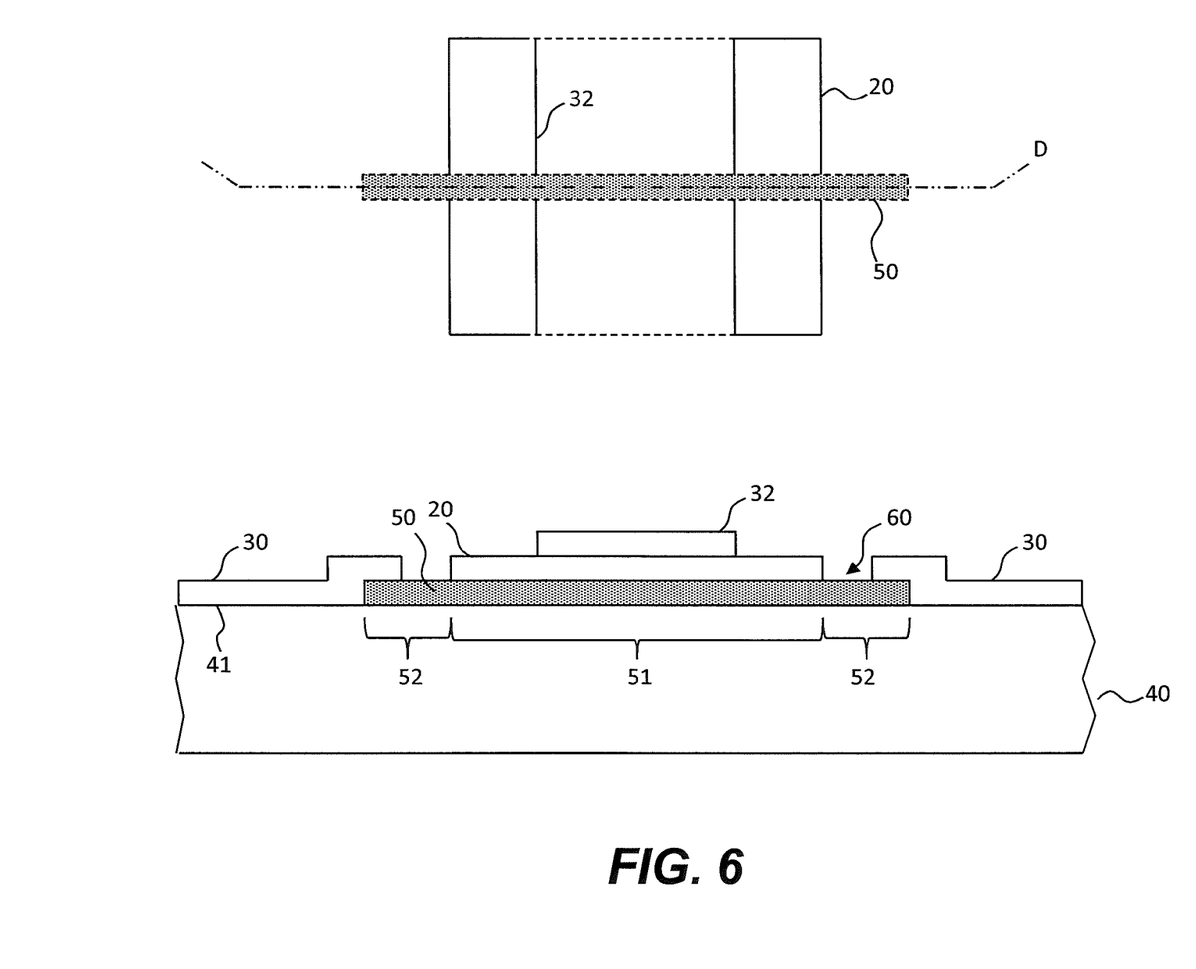
FIG. 6 is a plan view and corresponding cross section D of another embodiment of the present invention having a printed micro-wire.

FIGS. 4A and 4B include orthogonal versions of the plan view of FIG. 3 with corresponding and aligned cross sections taken along cross section lines A and B, respectively. As shown in FIGS. 4A and 4B, cured-layer 10 having embossed micro-channels 60 with micro-wires 50 is formed on substrate surface 41 of substrate 40. Micro-wires 50 can, but do not necessarily, fill micro-channels 60. Dielectric insulator 20 is formed over a portion of cured-layer surface 12 and micro-wires 50 at the juncture between horizontal and vertical electrodes 70, 80, (not shown) forming insulated micro-wire portion 51 in the middle of micro-wire 50 and exposed micro-wire portions 52 at the ends of the micro-wire 50. Transparent conductor 30 is patterned over cured-layer surface 12 to form touch sensors 90 (not shown). Conformally coated transparent conductors 30 forming touch sensors 90 in horizontal electrodes 70 are electrically connected to corresponding micro-wires 50. Transparent conductor electrical connections 32 are patterned over dielectric insulator 20 to form corresponding electrical connections between touch sensors 90 in vertical electrodes 80. These electrical connections are facilitated by conformal coating, since in practice the micro-wires 50 do not necessarily extend to cured-layer surface 12 in embossed micro-channel 60, as illustrated in FIGS. 4A and 4B or extend above cured-layer surface 12 (as shown in FIG. 6 discussed below). The electrical connection between touch sensors 90 in vertical electrodes 80 and transparent conductor electrical connection 32 is similarly facilitated by conformal coating since dielectric insulator 20 can also form a vertical edge.

Figure 5:
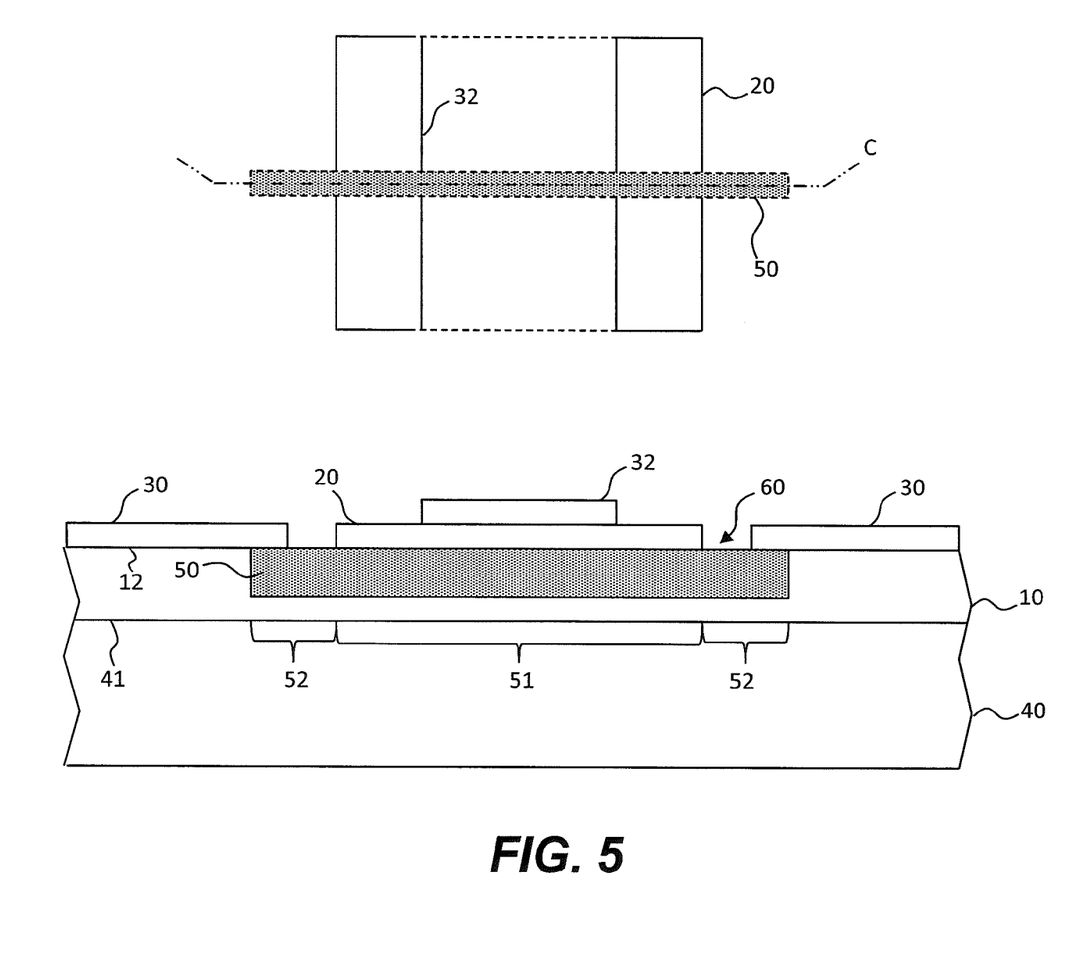
FIG. 5 is a plan view and corresponding cross section C of an alternative embodiment of the present invention having a narrow micro-wire.

Micro-wire 50 illustrated in FIGS. 4A and 4B are relatively long compared to the dielectric insulator 20 width. In some embodiments, dielectric insulator 20 is deposited using inkjet deposition of polymer material. Such deposition can have limited resolution, for example 20 microns or greater. It is preferred that micro-wires 50 that are for example typically opaque, are as small as possible to reduce their visibility. Thus, as shown in the FIG. 5 plan view, micro-wire 50 is illustrated as much narrower than dielectric insulator 20, for example as small as a few microns in width, for example 4 microns or less. FIG. 5 cross section C illustrates cured-layer 10 having embossed micro-channels 60 with micro-wires 50 formed on substrate surface 41 of substrate 40. Dielectric insulator 20 is formed over a portion of cured-layer surface 12 and micro-wires 50 at the juncture between horizontal and vertical electrodes 70, 80, forming insulated micro-wire portion 51 in the middle of micro-wire 50 and exposed micro-wire portions 52 at the ends of the micro-wire 50. Transparent conductor 30 is patterned over cured-layer surface 12 and dielectric insulator 20 to form touch sensors 90 and transparent conductor electrical connection 32 and corresponding electrical connections between touch sensors 90 in horizontal electrodes 70 and vertical electrodes 80 (not shown).

In an alternative embodiment illustrated in FIG. 6, printed micro-wires 50 are formed on substrate surface 41 of substrate 40. Dielectric insulator 20 is formed over portions of substrate surface 41 and micro-wires 50 at the juncture between horizontal and vertical electrodes 70, 80 (not shown), forming insulated micro-wire portion 51 in the middle of micro-wire 50 and exposed micro-wire portions 52 at the ends of the micro-wire 50. Transparent conductor 30 is patterned over cured-layer surface 12 and dielectric insulator 20 to form touch sensors 90 (not shown) and transparent conductor electrical connection 32 and corresponding electrical connections between touch sensors 90 in horizontal electrodes 70 and vertical electrodes 80 (not shown).

Figure 7:
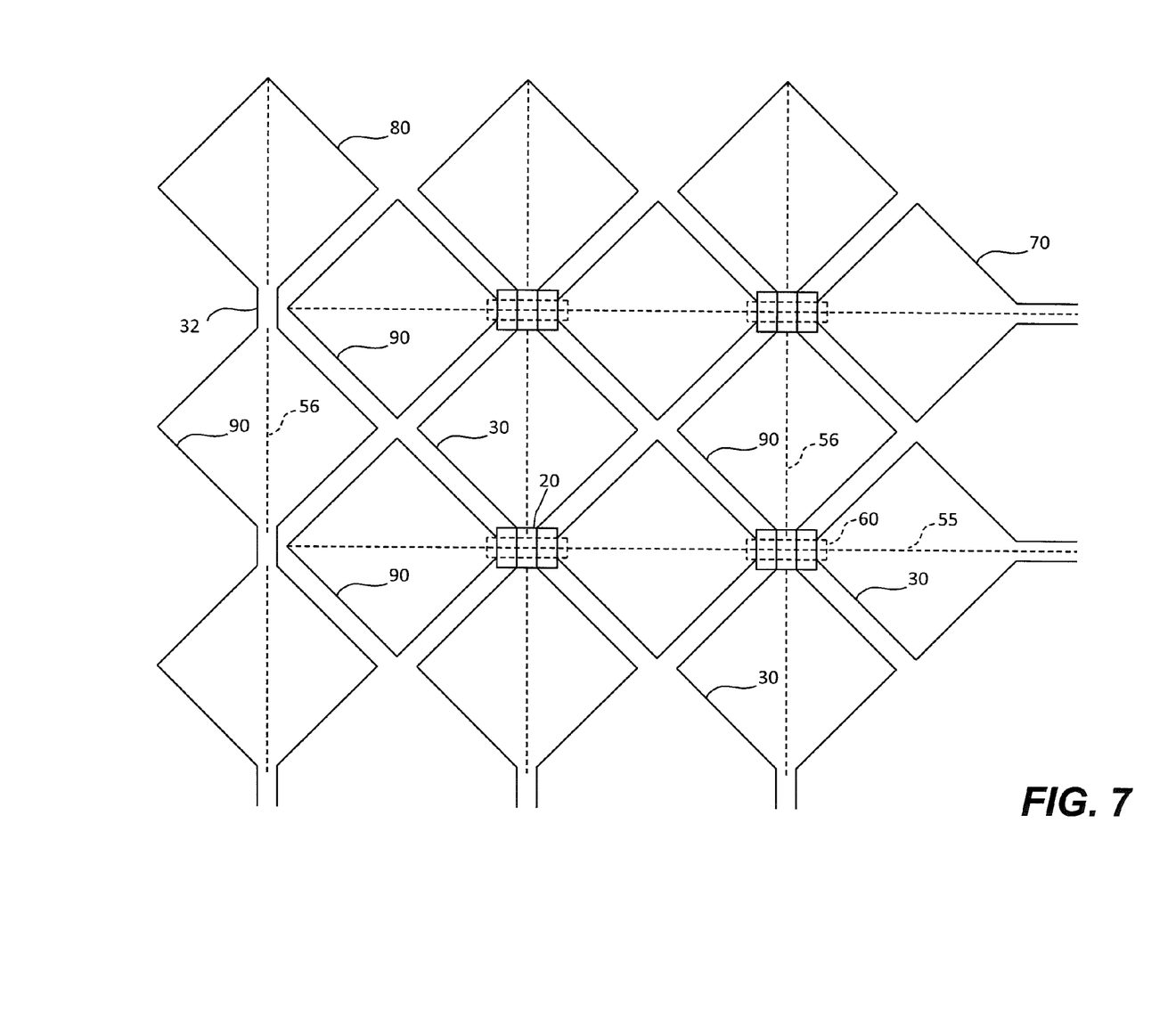
FIG. 7 is a plan view of yet another embodiment of the present invention having micro-wires and transparent conductors in touch sensor areas.

In a further embodiment of the present invention, referring to FIG. 7, micro-wires 55 extend along the length of horizontal electrodes 70 and touch sensors 90 in horizontal electrodes 70 under dielectric insulator 20 in micro-channel 60. Micro-wires 56 extend along each touch sensor 90 in horizontal electrodes 80. Such micro-wires can improve the conductivity of transparent conductor 30 in horizontal and vertical electrodes 70, 80 while maintaining electrical isolation between horizontal and vertical electrodes 70, 80. More than one micro-wire 55 or 56 can be used in horizontal or vertical electrodes 70, 80, respectively.

Figure 8:
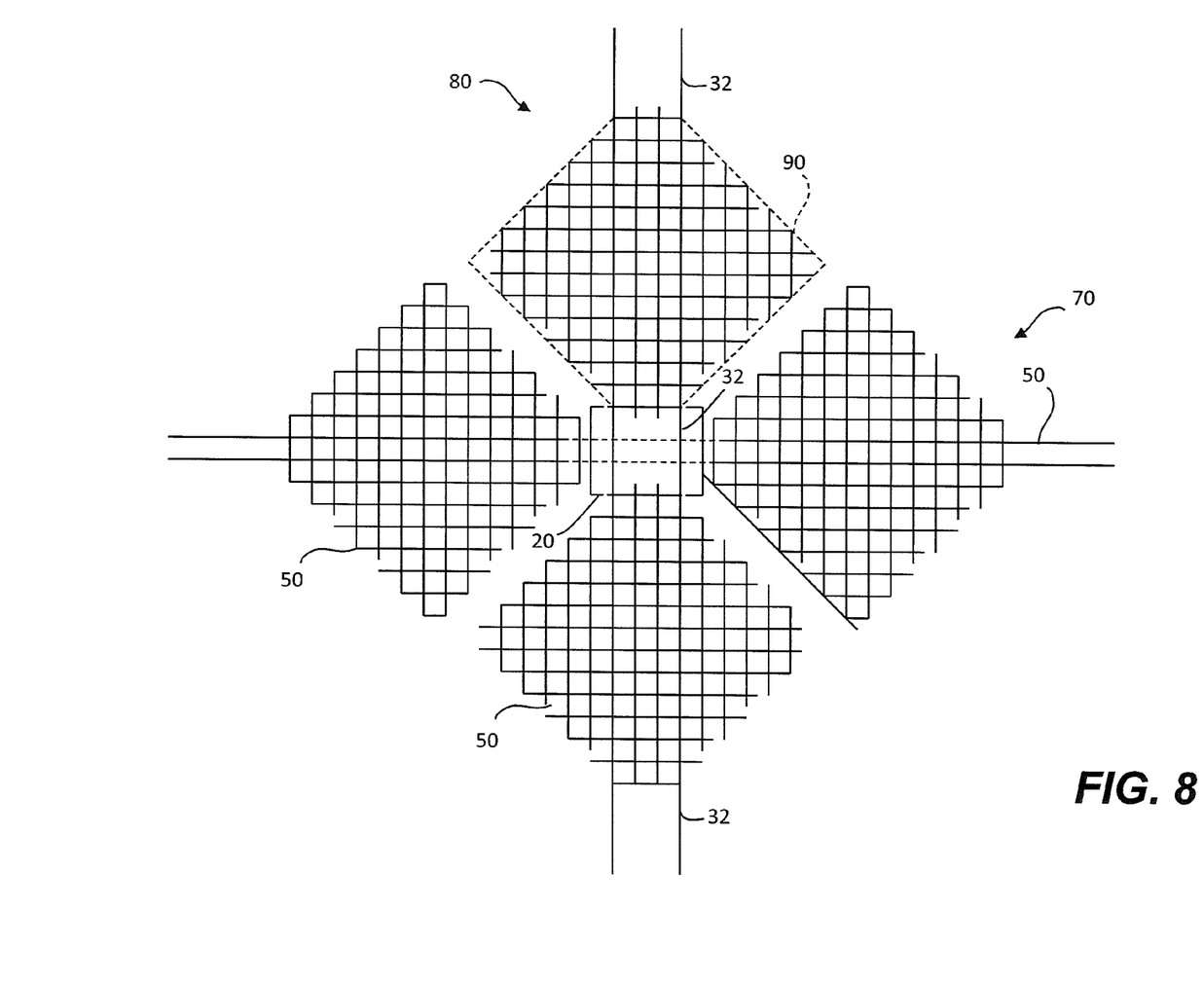
FIG. 8 is a plan view of yet another embodiment of the present invention having micro-wire touch sensors.

In another embodiment and as shown in FIG. 8, touch sensors 90 are formed from micro-wires 50. Micro-wires 50 are spaced apart to form transparent electrodes, typically in a grid array of electrically connected micro-wires 50 in one touch sensor 90, although any useful pattern is included in the present invention. Thus, touch sensors 90 and micro-wire 50 extending beneath dielectric insulator 20 are formed in a common step and are part of a single layer. In this embodiment, the function of transparent conductor 30 in FIG. 2 is performed by the micro-wire grid array; the other elements are the same and perform the same function. Micro-wire 50 beneath dielectric insulator 20 electrically connects touch sensors 90 (formed from a transparent micro-wire grid electrode) in horizontal electrodes 70 and transparent conductor electrical connection 32 electrically connects touch sensors 90 (also formed from a transparent micro-wire grid electrode) in vertical electrodes 80. This embodiment of the present invention provides an advantage over the prior art in that such micro-wires 50 can provide improved transparency and conductivity, as well as enhanced manufacturability. Dielectric insulator 20 and transparent conductor electrical connection 32 are formed as described above. Transparent conductor electrical connection 32 electrically connects to micro-wires 50 in the same way that transparent conductor 30 electrically connects to micro-wires 50 in FIGS. 1-7. Cured layer 10 is a layer of curable material that has been cured.

For example, cured layer 10 is formed of a curable material coated or otherwise deposited on substrate surface 41 of substrate 40 to form a curable layer and then cured to form a cured layer 10. The substrate-coated curable material is considered herein to be a curable layer before it is cured and cured layer 10 after it is cured. Similarly, a cured electrical conductor is an electrical conductor formed by locating a curable material in micro-channel 60 and curing the curable material to form micro-wire 50 in micro-channel 60.

As used herein, curing refers to changing the properties of a material by processing the material in some fashion, for example by heating, drying, irradiating the material, or exposing the material to a chemical, energetic particles, gases, or liquids.

In an embodiment, cured layer 10 is a layer that is embossed in a single step and cured in a single step. In another embodiment, the embossing step and the curing step are different single steps. For example, the curable layer is embossed in a first step using a stamping method known in the art and cured in a second different step, e.g. by heat or exposure to radiation to form cured layer 10. In another embodiment, embossing and curing the curable layer is done in a single common step. The curable layer is deposited as a single layer in a single step using coating methods known in the art, e.g. curtain coating. In an alternative embodiment, the curable layer is deposited as multiple sub-layers using multi-layer deposition methods known in the art, e.g. multi-layer slot coating, repeated curtain coatings, or multi-layer extrusion coating. In yet another embodiment, the curable layer includes multiple sub-layers formed in different, separate steps, for example with a multi-layer extrusion, curtain coating, or slot coating machine as is known in the coating arts. Micro-channel 60 is embossed and cured in the curable layer in a single step and micro-wires 50 are formed by depositing a curable conductive ink in micro-channels 60 and curing the curable conductive ink to form an electrically conductive micro-wire 50.

Cured layer 10 useful in the present invention can include a cured polymer material with cross-linking agents that are sensitive to heat or radiation, for example infra-red, visible light, or ultra-violet radiation. The polymer material is a curable material applied in a liquid form that hardens when the cross-linking agents are activated. When a molding device, such as an embossing stamp having an inverse micro-channel structure is applied to liquid curable material in the curable layer coated on substrate 40 and the cross-linking agents in the curable material are activated, the liquid curable material in the curable layer is hardened into cured layer 10 having micro-channels 60. The liquid curable materials can include a surfactant to assist in controlling coating on substrate 40. Materials, tools, and methods are known for embossing coated liquid curable materials to form cured layers 10 having conventional micro-channels.

Similarly, curable inks useful in the present invention are known and can include conductive inks having electrically conductive nano-particles, such as silver nano-particles. In an embodiment, the electrically conductive nano-particles are metallic or have an electrically conductive shell. The electrically conductive nano-particles can be silver, can be a silver alloy, or can include silver.

Curable inks provided in a liquid form are deposited or located in micro-channels 60 and cured, for example by heating or exposure to radiation such as infra-red, visible light, or ultra-violet radiation. The curable ink hardens to form the cured ink that makes up micro-wires 50. For example, a curable conductive ink with conductive nano-particles are located within micro-channels 60 and cured by heating or sintering to agglomerate or weld the nano-particles together, thereby forming an electrically conductive micro-wire 50. Materials, tools, and methods are known for coating liquid curable inks to form micro-wires 50 in conventional micro-channels.

Figure 9:
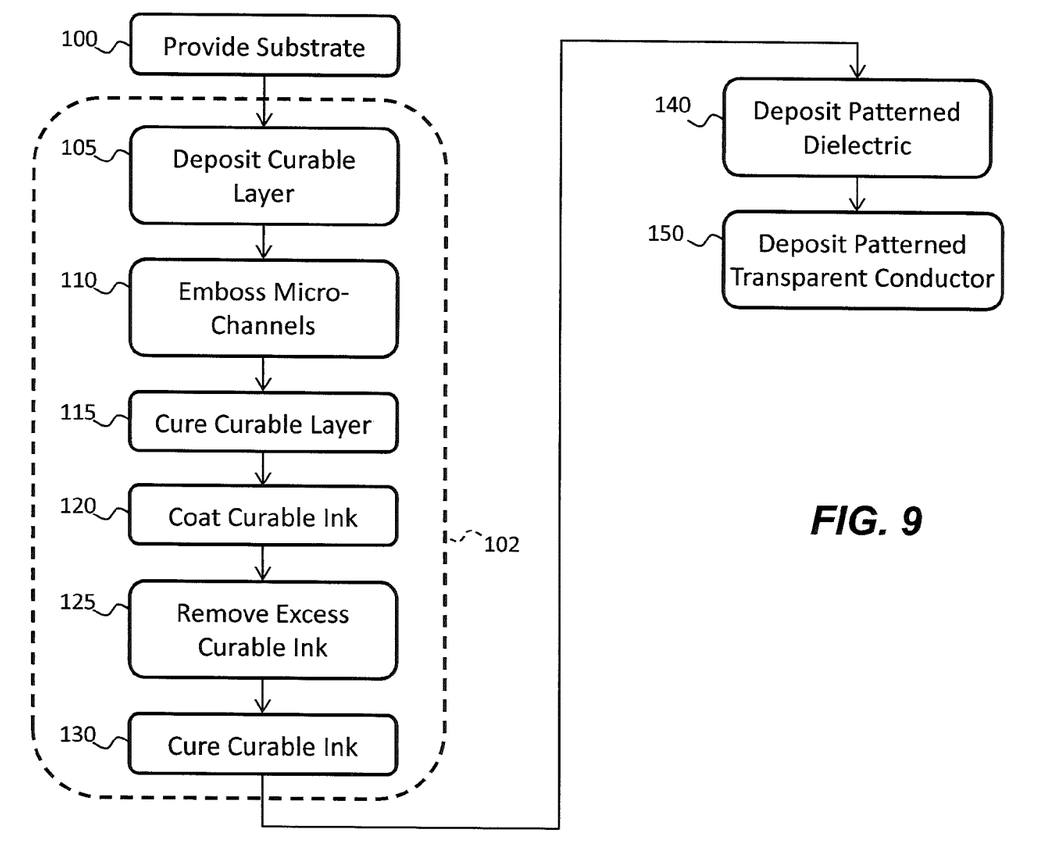
FIG. 9 is a flow diagram illustrating an embodiment of the present invention.

Referring to FIG. 9 and to FIGS. 1-8, a method of making a single-side touch-screen device according to an embodiment of the present invention includes providing 100 a substrate 40. A patterned arrangement of micro-wires 50 is formed 102 on or over substrate 40. Dielectric insulator 20 is pattern-wise deposited 140 over at some portion of micro-wires 50 and transparent conductor 30 is pattern-wise deposited 150 on or over substrate 40 and dielectric insulator 20.

Dielectric insulator 20 can be any of many known dielectric materials included polymers or oxides and are deposited and patterned 140 in any of a variety of known ways, including pattern-wise inkjet deposition, sputter or coating through a mask or blanket coated and patterned using known photo-lithographic methods. Such known photo-lithographic technology can include a photo-sensitive material that is optically patterned through a mask to cure the photo-sensitive material and removal of uncured material.

Micro-wires 50 are formed 102 in an embodiment by depositing 105 a polymer curable layer on first substrate surface 41 of substrate 40. One or more micro-channels 60 are embossed 110 into the curable layer. The curable layer is cured 115 to form cured layer 10.

Curable ink is coated 120 over cured-layer surface 12 and micro-channels 60 of cured layer 10 and excess curable ink removed 125 from cured-layer surface 12 so that curable ink is only located in micro-channels 60. The curable ink is cured 130. The cured ink forms electrically conductive micro-wires 50 in micro-channels 60.

According to various embodiments of the present invention, the curable ink includes electrically conductive nano-particles and curing step 130 sinters or agglomerates the electrically conductive nano-particles to form micro-wires 50. In other embodiments, the electrically conductive nano-particles are silver, a silver alloy, include silver, or have an electrically conductive shell.

In another embodiment, coating 120 the curable ink includes coating the curable ink in a liquid state and curing 130 the curable ink includes curing the curable ink into a solid state.

Figure 10:
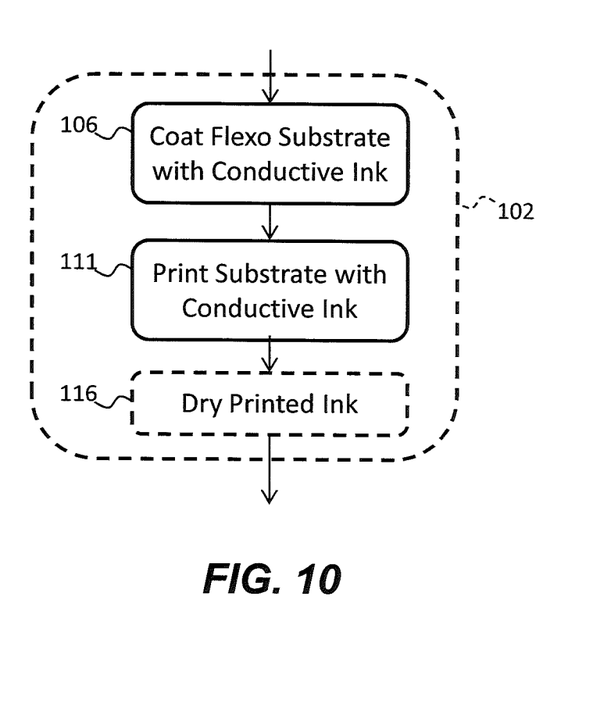
FIG. 10 is a flow diagram illustrating patterning micro-wires according to an embodiment of the present invention.

Referring to FIG. 10 in an alternative embodiment, micro-wires 50 are formed 102 by coating a flexographic substrate 106 having a raised pattern corresponding to a desired micro-wire pattern with a conductive ink. The flexographic substrate is brought into contact with substrate surface 41 to print 111 the conductive ink onto substrate surface 41. In an optional step, the conductive ink is dried 116. Flexographic substrates are known in the flexographic printing arts.

In an embodiment, transparent conductor 30 and transparent conductor electrical connection 32 are deposited by sputtering or deposition and patterned either with masks or by photolithographic processes. In another embodiment, atomic layer deposition methods are used to form a transparent conductive layer, for example a patterned aluminum zinc oxide layer using methods known in the art. Patterning is accomplished by masking the deposition or by photolithographic processes.

Figure 11:
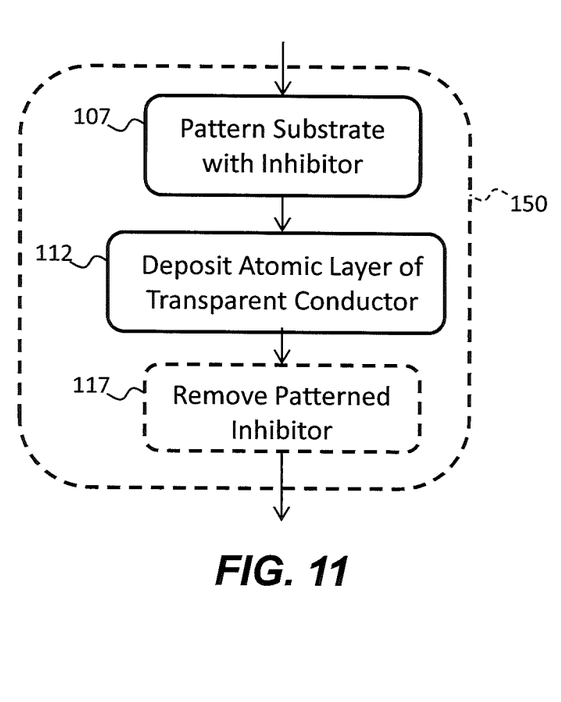
FIG. 11 is a flow diagram illustrating patterning transparent conductors according to an embodiment of the present invention.

In an alternative embodiment, referring to FIG. 11, the substrate is coated 107 with a patterned inhibitor and then atomic layer deposition (ALD) is used to deposit 112 transparent conductive material, for example aluminum zinc oxide. The patterned inhibitor directs the growth of ALD-deposited material, for example as disclosed in U.S. Pat. No. 8,273,654. By inhibiting the growth where the deposition material is present, the deposition only deposits in regions (selective areas) of the substrate where the inhibitor is not present. The inhibitor prevents atomic layer deposition, thereby forming a transparent conductor pattern that is a reverse of the inhibitor-material pattern. Optionally, the patterned inhibitor material is removed 117.

In an embodiment, a polymeric deposition inhibitor material is cross-linked after applying the polymer onto the substrate, before or during the patterning step. The deposition inhibitor material is a compound or polymer that, after being applied, is subsequently polymerized, cross linked, or polymerized and cross linked. The deposition inhibitor material is a compound or polymer that forms a self-assembled monolayer on the substrate. Polymers are preferably addition polymers such as, for example, a poly(perfluoroalkyl methacrylate); poly(perfluoroalkyl methacrylate); poly(methyl methacrylate); poly(cyclohexyl methacrylate); poly(benzyl methacrylate); poly(iso-butylene); poly(9,9-dioctylfluorenyl-2,7-diyl); polystyrene; poly(vinyl alcohol); poly(methyl methacrylate); poly(hexafluorobutyl methacrylate), and copolymers thereof, wherein the alkyl has one to six carbon atoms.

Cross linking is used to insolubilize a polymeric deposition inhibitor material after application onto the surface of the substrate. The cross linking can occur prior to patterning or can occur during patterning in order to contribute to the patterning step, for example, by employing cross linking initiated by, and patterned by, actinic radiation, followed by removal of non-cross linked polymer, for example, by solvent.

In an embodiment, the deposition inhibitor material is an organosiloxane polymer. Organosiloxane polymers are defined to include polymers, prepolymers, or macromonomers having at least 20 siloxane repeat units. Particularly preferred are deposition inhibitor materials that, after application onto the substrate, and any cross linking or intermolecular reaction, are insoluble. Such organosiloxane polymers include random or block or cross linked polymers or combinations thereof. Optionally, functional groups are present on the organosiloxane polymer such as terminal groups (also referred to as end caps). Cross linking groups or functional groups or combinations of cross linking groups and functional groups can also be present, for example, located on a side chain off a siloxane backbone. Examples of organosiloxane polymers include poly(alkylsiloxane), poly(arylsiloxane), poly(alkylarylsiloxane), and poly(alkyl(aryl) siloxane), each optionally having functional groups.

Functionalized poly(siloxanes) include epoxy-functionalized, carboxyl-functionalized, polyether-functionalized, phenol-functionalized, amino-functionalized, alkoxy-functionalized, methacryl-functionalized, carbinol-functionalized, hydroxy-functionalized, vinyl-functionalized, acrylic-functionalized, silane-functionalized, trifluoro-functionalized, or mercapto-functionalized poly(organosiloxanes). Block copolymers can also be employed if containing substantial siloxane repeat units. Such polymers can be prepared as described in numerous patents and publications or are commercially available from, for example, General Electric Company, Schenectady, N.Y.; Dow Corning, Midland, Mich.; or Petrarch Systems, Bristol, Pa.

The deposition inhibiting material layer includes one of a self-assembled monolayer, a polymer, and a water-soluble polymer. The self-assembled monolayer is performed by exposing the substrate to a vapor, a liquid, or a liquid solution of a precursor material. Precursor materials include silanes, phosphonates, thiols, alcohols, amines, or ammonium salts. The polymer is soluble in any convenient solvent and can have any useful molecular weight, preferably in the range of 2,000 to 2,000,000. It can include a single functional group, or can include a plurality of functional groups. In the case of a plurality, the polymer can be a random, periodic, or block polymer. For polymers with chiral centers the polymer can be isotactic, syndiotactic, or atactic. The polymer can have side chains and can be a graft copolymer. The polymer can be linear or branched. The polymer can have low numbers of free acid groups. Preferred polymers that a soluble in non polar solvents are poly(methylmethcrylate), silicone polymers including poly(dimethylsiloxane), poly(carbonates), poly (sulfones), and poly(esters). Polymers with chemical modification are preferred, including polymers modified with fluorine or fluorine containing compounds. Polymers soluble in polar solvents such as water, alcohols, or ketones are particularly preferred. Polymers can include amide groups, such as poly(amide), poly(vinylpyrollidone), and poly(2-ethyl-oxazoline). Polymers can include ether linkages, such as poly (ethylene glycol). Polymers can include alcohol functionalities, such as poly(vinyl alcohol). Polymers can include neutralized acid groups such as sodium poly(styrene sulfonate) and the sodium salt of poly(acrylic acid).

In some embodiments, the deposition inhibitor material is chosen specifically for the material to be deposited. The deposition inhibitor material has a given inhibition power. The inhibition power is defined as the layer thickness at or below which the deposition inhibitor material is effective. Preferably, the deposition inhibitor material, during use, exhibits an inhibition power of at least 50 Å, more preferably at least 100 Å, most preferably at least 300 Å. The deposition of the deposition inhibitor material is in a patterned manner, such as using inkjet, flexography, gravure printing, micro-contact printing, offset lithography, patch coating, screen printing, or transfer from a donor sheet. In alternative embodiments, a uniform layer of the deposition inhibitor material is deposited and then patterned form a patterned layer of the deposition inhibitor material. Preprocessing treatments for patterning the inhibitor include patterning of substrate prior to inhibitor application to modify the hydrophobicity, electric charge, absorption, or roughness of the substrate. Post processing treatments include light exposure, light exposure and subsequent liquid based development, and ablation.

Providing the patterned deposition inhibiting material layer on the substrate includes using at least one of an inkjet printing process, a flexographic printing process, a gravure printing process, and a photolithographic printing process. The active inhibiting material is suspended or dissolved in a solvent or vehicle. The material can include surfactants, stabilizers, or viscosity modifiers. The printed material is dried using natural convection, forced convection, or radiant heat. The material is treated to change its morphology or chemical composition. A preferred chemical composition change is to crosslink the material. The change in morphology or chemical composition is accomplished by exposure to a vapor phase or liquid phase reactant, or treatment with heat or light. Preferred processes include the cross-linking of material with UV light.

According to various embodiments of the present invention, substrate 40 is any material having a first surface 41 on which a cured layer 10 is formed. Substrate 40 is a rigid or a flexible substrate made of, for example, a glass, metal, plastic, or polymer material, can be transparent, and can have opposing substantially parallel and extensive surfaces. Substrates 40 can include a dielectric material useful for capacitive touch screens and can have a wide variety of thicknesses, for example 10 microns, 50 microns, 100 microns, 1 mm, or more. In various embodiments of the present invention, substrates 40 are provided as a separate structure or are coated on another underlying substrate, for example by coating a polymer substrate layer on an underlying glass substrate.

Substrate 40 is an element of other devices, for example the cover or substrate of a display or a substrate, cover, or dielectric layer of a touch screen. According to embodiments of the present invention, micro-wires 50 extend across at least a portion of substrate 40 in a direction parallel to substrate surface 41 of substrate 40. In an embodiment, a substrate 40 of the present invention is large enough for a user to directly interact therewith, for example using an implement such as a stylus or using a finger or hand. Methods are known in the art for providing suitable surfaces on which to coat a single curable layer. In a useful embodiment, substrate 40 is substantially transparent, for example having a transparency of greater than 90%, 80% 70% or 50% in the visible range of electromagnetic radiation.

Electrically conductive micro-wires 50 and methods of the present invention are useful for making electrical conductors and busses for transparent micro-wire electrodes and electrical conductors in general, for example as used in electrical busses. A variety of micro-wire patterns are used and the present invention is not limited to any one pattern. Micro-wires 50 can be spaced apart, form separate electrical conductors, or intersect to form a mesh electrical conductor on, in, or above substrate 40. Micro-channels 60 can be identical or have different sizes, aspect ratios, or shapes. Similarly, micro-wires 50 can be identical or have different sizes, aspect ratios, or shapes. Micro-wires 50 can be straight or curved.

A micro-channel 60 is a groove, trench, or channel formed on or in substrate 40 extending from cured-layer surface 12 toward substrate surface 41 of substrate 40 and having a cross-sectional width for example less than 20 microns, 10 microns, 5 microns, 4 microns, 3 microns, 2 microns, 1 micron, or 0.5 microns, or less. In an embodiment, cross-sectional depth of micro-channel 60 is comparable to its width. Micro-channels 60 can have a rectangular cross section, as shown. Other cross-sectional shapes, for example trapezoids, are known and are included in the present invention. The width or depth of a layer is measured in cross section.

In various embodiments, cured inks can include metal particles, for example nano-particles. The metal particles are sintered to form a metallic electrical conductor. The metal nano-particles are silver or a silver alloy or other metals, such as tin, tantalum, titanium, gold, copper, or aluminum, or alloys thereof. Cured inks can include light-absorbing materials such as carbon black, a dye, or a pigment.

In an embodiment, a curable ink can include conductive nano-particles in a liquid carrier (for example an aqueous solution including surfactants that reduce flocculation of metal particles, humectants, thickeners, adhesives or other active chemicals). The liquid carrier is located in micro-channels 60 and heated or dried to remove liquid carrier or treated with hydrochloric acid, leaving a porous assemblage of conductive particles that can be agglomerated or sintered to form a porous electrical conductor in a layer. Thus, in an embodiment, curable inks are processed to change their material compositions, for example conductive particles in a liquid carrier are not electrically conductive but after processing form an assemblage that is electrically conductive.

Once deposited, the conductive inks are cured, for example by heating. The curing process drives out the liquid carrier and sinters the metal particles to form a metallic electrical conductor. Conductive inks are known in the art and are commercially available. In any of these cases, conductive inks or other conducting materials are conductive after they are cured and any needed processing completed. Deposited materials are not necessarily electrically conductive before patterning or before curing. As used herein, a conductive ink is a material that is electrically conductive after any final processing is completed and the conductive ink is not necessarily conductive at any other point in micro-wire 50 formation process.

In various embodiments of the present invention, micro-channel 60 or micro-wire 50 has a width less than or equal to 10 microns, 5 microns, 4 microns, 3 microns, 2 microns, or 1 micron. In an example and non-limiting embodiment of the present invention, each micro-wire 50 is from 10 to 15 microns wide, from 5 to 10 microns wide, or from 5 microns to one micron wide. In some embodiments, micro-wire 50 can fill micro-channel 60; in other embodiments micro-wire 50 does not fill micro-channel 60. In an embodiment, micro-wire 50 is solid; in another embodiment micro-wire 50 is porous.

Micro-wires 50 can be metal, for example silver, gold, aluminum, nickel, tungsten, titanium, tin, or copper or various metal alloys including, for example silver, gold, aluminum, nickel, tungsten, titanium, tin, or copper. Micro-wires 50 can include a thin metal layer composed of highly conductive metals such as gold, silver, copper, or aluminum. Other conductive metals or materials can be used. Alternatively, micro-wires 50 can include cured or sintered metal particles such as nickel, tungsten, silver, gold, titanium, or tin or alloys such as nickel, tungsten, silver, gold, titanium, or tin. Conductive inks are used to form micro-wires 50 with pattern-wise deposition or pattern-wise formation followed by curing steps. Other materials or methods for forming micro-wires 50, such as curable ink powders including metallic nano-particles, are employed and are included in the present invention.

Electrically conductive micro-wires 50 of the present invention can be operated by electrically connecting micro-wires 50 through connection pads and electrical connectors to electrical circuits that provide electrical current to micro-wires 50 and can control the electrical behavior of micro-wires 50. Electrically conductive micro-wires 50 of the present invention are useful, for example in touch screens such as projected-capacitive touch screens that use transparent micro-wire electrodes and in displays. Electrically conductive micro-wires 50 can be located in areas other than display areas, for example in the perimeter of the display area of a touch screen, where the display area is the area through which a user views a display.

A single-side touch-screen device has been constructed. A glass substrate was coated with a transparent, UV sensitive photo-resist SU8-2010 (available from MicroChem) to form a curable layer approximately 10 microns thick. Micro-channels 60 were formed in the curable layer and the structure cured to form a cured layer 10 having micro-channels 60. A curable conductive ink was coated over the cured layer 10 and in micro-channels 60, excess material removed from the cured layer 10, and the curable conductive ink in the micro-channels 60 cured to form patterned micro-wires 50 in the micro-channels 60. A photo-resist was coated and patterned over the cured layer 10 to form patterned dielectric insulators 20 forming insulated micro-wire portions 51 having a thickness of approximately 0.5 microns. A layer of aluminum zinc oxide was coated using atomic layer deposition over cured layer 10, dielectric insulators 20, and exposed micro-wire portions 52. The layer of aluminum zinc oxide was patterned to form the structure illustrated in FIGS. 1-3, 4A, and 4B.

Methods and devices for forming and providing substrates and coating substrates are known in the photo-lithographic arts. Likewise, tools for laying out electrodes, conductive traces, and connectors are known in the electronics industry as are methods for manufacturing such electronic system elements. Hardware controllers for controlling touch screens and displays and software for managing display and touch screen systems are well known. These tools and methods can be usefully employed to design, implement, construct, and operate the present invention. Methods, tools, and devices for operating capacitive touch screens are used with the present invention.

The present invention is useful in a wide variety of electronic devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other touch-screen devices such as capacitive touch screen devices.

The invention has been described in detail with particular reference to certain embodiments thereof, but it will be understood that variations and modifications can be effected within the spirit and scope of the invention.

PARTS LIST

A cross section
B cross section
C cross section
D cross section
10 cured layer
12 cured-layer surface
20 dielectric insulator
30 transparent conductor
=transparent conductor electrical connection
40 substrate
41 substrate surface.
50 micro-wire
51 insulated micro-wire portion/middle portion
52 exposed micro-wire portion
55 micro-wire
56 micro-wire
60 micro-channel
70 horizontal electrode
80 vertical electrode
80 touch sensor
100 provide substrate step
102 form micro-wires step
105 deposit curable layer step
106 coat flexographic substrate with conductive ink step
107 pattern substrate with inhibitor step
110 emboss micro-channels step
111 print substrate with coated flexographic ink step
112 deposit atomic layer of transparent conductor step
115 cure curable layer step
116 optional dry ink step
117 optional remove patterned inhibitor step
Parts List (Con't)
120 coat curable ink step
125 remove excess conductive ink step
130 cure conductive ink step
140 deposit patterned dielectric step
150 deposit patterned transparent conductor step

The invention claimed is:

1. A single-side touch-screen device, comprising:
a substrate;
a cured layer formed on the substrate, the cured layer having a patterned arrangement of micro-channels embossed therein and a cured electrically conductive micro-wire formed in each micro-channel;
a patterned dielectric insulator located over one or more middle portions of at least some of the micro-wires forming insulated micro-wire portions and exposed micro-wire portions;
a plurality of patterned transparent conductors conformally coated in an array over at least a part of the patterned dielectric insulator, at least a part of the insulated micro-wire portions, and at least a part of the exposed micro-wire portions, the at least a part of the exposed micro-wire portions electrically connected to at least a portion of the patterned transparent conductors;
wherein the transparent conductors and the micro-wires form an array of electrically connected horizontal electrodes and an array of electrically connected vertical electrodes electrically isolated from the horizontal electrodes;
wherein the micro-wires form a two-dimensional array of touch sensors having separate horizontal rows and vertical columns, each horizontal row of touch sensors forming a horizontal electrode and each vertical column forming a vertical electrode; and
wherein the touch sensors in vertical columns are electrically connected through the micro-wires and the touch sensors in horizontal rows are electrically connected through conformally coated transparent conductors, or
wherein the touch sensors in vertical columns are electrically connected through conformally coated transparent conductors and the touch sensors in horizontal rows are electrically connected through the micro-wires.

2. The single-side touch-screen device of claim 1, wherein conformally coated transparent conductors only electrically connect neighboring touch sensors in horizontal rows or in vertical columns.

3. The single-side touch-screen device of claim 1, wherein conformally coated transparent conductors extend along and are in electrical contact with the touch sensors in horizontal rows or in vertical columns.

4. The single-side touch-screen device of claim 1, wherein touch sensors are shaped as diamonds.

5. The single-side touch-screen device of claim 1, wherein the transparent conductors form an atomic layer.

6. The single-side touch-screen device of claim 5, wherein the transparent conductors include aluminum zinc oxide.

* * * * *